United States Patent
Clark

(10) Patent No.: US 8,141,828 B2
(45) Date of Patent: Mar. 27, 2012

(54) INSERT PLATE LEVELING

(75) Inventor: Scott L. Clark, Boone, IA (US)

(73) Assignee: Allen IP Inc., Huxley, IA (US)

( * ) Notice: Subject to any disclaimer, the term of this patent is extended or adjusted under 35 U.S.C. 154(b) by 224 days.

(21) Appl. No.: 12/106,867

(22) Filed: Apr. 21, 2008

(65) Prior Publication Data
US 2009/0261217 A1 Oct. 22, 2009

(51) Int. Cl.
F16M 11/04 (2006.01)
F16M 11/18 (2006.01)
A47B 13/00 (2006.01)

(52) U.S. Cl. ............... 248/188.4; 248/188.1; 248/188.2; 108/157.1; 108/159.11

(58) Field of Classification Search ............... 248/188.4, 248/618, 188.1, 188.2, 188.3, 188; 108/150, 108/157.1, 159.11
See application file for complete search history.

(56) References Cited

U.S. PATENT DOCUMENTS

| | | | |
|---|---|---|---|
| 821,225 A * | 5/1906 | Dozier | 248/188.4 |
| 1,285,628 A | 11/1918 | Craley | |
| 1,994,422 A | 3/1935 | Sasek | |
| 2,020,222 A * | 11/1935 | Tautz | 269/309 |
| 2,260,708 A | 10/1941 | French | |
| 2,285,897 A | 6/1942 | Campbell | |
| 2,787,301 A | 4/1957 | Anderson | |
| 2,831,746 A * | 4/1958 | Hartnett | 312/306 |
| 3,827,686 A | 8/1974 | Storkh | |
| 3,994,484 A | 11/1976 | Schorr | |
| 4,062,123 A | 12/1977 | Lundquist | |
| 4,256,000 A | 3/1981 | Seidel | |
| 4,693,158 A | 9/1987 | Price | |
| 4,747,330 A | 5/1988 | Carithers, Jr. | |
| 4,817,693 A | 4/1989 | Schuler | |
| 4,871,156 A | 10/1989 | Kozyrski et al. | |
| 4,887,653 A | 12/1989 | Thomas | |
| 5,018,562 A | 5/1991 | Adams | |
| 5,038,486 A | 8/1991 | Ducate, Sr. | |
| 5,063,983 A | 11/1991 | Barry | |
| 5,139,061 A | 8/1992 | Neilson | |
| 5,155,556 A | 10/1992 | Foanio | |
| 5,337,641 A | 8/1994 | Duginske | |

(Continued)

OTHER PUBLICATIONS

Final Office Action dated Jul. 20, 2009 for U.S. Appl. No. 11/381,805, (12 pages).

(Continued)

Primary Examiner — Terrell McKinnon
Assistant Examiner — Chiedu Chibogu
(74) Attorney, Agent, or Firm — Zarley Law Firm, P.L.C.

(57) ABSTRACT

An assembly comprises a support table including a support table orifice; a insert plate within the support table orifice; and at least one mounting and leveling apparatus. The mounting and leveling apparatus comprises a clamp screw; at least two leveling screws; at least one mounting screw; and a mounting bracket that defines a first threaded hole that threadably engages the clamp screw, a second hole that receives the at least one mounting screw and a third set of threaded holes that each threadably engages one of the at least two leveling screws. The clamp screw pulls the insert plate towards the mounting bracket when tightened. The at least one mounting screw couples the mounting bracket to the support table. The at least two leveling screws are independently adjustable to allow a top surface of the insert plate to be precisely aligned with a top surface of the support table.

9 Claims, 4 Drawing Sheets

U.S. PATENT DOCUMENTS

| | | | |
|---|---|---|---|
| 5,388,337 A | 2/1995 | Powers, II | |
| 5,398,740 A * | 3/1995 | Miller | 144/286.1 |
| 5,443,554 A | 8/1995 | Robert | |
| 5,490,665 A | 2/1996 | Thiele et al. | |
| 5,553,644 A | 9/1996 | Adams | |
| 5,608,970 A | 3/1997 | Owen | |
| 5,617,909 A | 4/1997 | Duginske | |
| 5,662,019 A | 9/1997 | Denman | |
| 5,695,178 A | 12/1997 | Lenzkes | |
| 5,716,045 A | 2/1998 | Taylor | |
| 5,725,036 A * | 3/1998 | Walter | 144/135.2 |
| 5,768,966 A | 6/1998 | Duginske | |
| 5,845,555 A | 12/1998 | Dawley | |
| 5,890,524 A | 4/1999 | Tucker et al. | |
| 5,918,652 A | 7/1999 | Tucker | |
| 5,970,835 A * | 10/1999 | Kenyon et al. | 83/477.2 |
| 5,979,283 A | 11/1999 | Osborne | |
| 6,076,445 A * | 6/2000 | Kenyon et al. | 83/477.2 |
| 6,189,429 B1 | 2/2001 | Liu | |
| 6,250,190 B1 | 6/2001 | Ceroll et al. | |
| 6,305,447 B1 * | 10/2001 | Rousseau | 144/135.2 |
| 6,505,659 B1 * | 1/2003 | Hummel | 144/135.2 |
| 6,520,224 B2 | 2/2003 | Smith | 144/135.2 |
| 6,520,227 B2 * | 2/2003 | McFarlin et al. | 144/371 |
| 6,557,601 B1 | 5/2003 | Taylor | |
| 6,792,984 B2 * | 9/2004 | Fontaine | 144/135.2 |
| 6,851,243 B1 | 2/2005 | Sandford | |
| 6,851,345 B1 | 2/2005 | Kennelly et al. | |
| 6,880,442 B2 | 4/2005 | Duginske | |
| 6,926,479 B1 * | 8/2005 | Taylor | 409/182 |
| 6,948,892 B2 * | 9/2005 | Hummel | 409/182 |
| 7,089,978 B2 * | 8/2006 | Karkosch et al. | 144/136.95 |
| 7,108,463 B2 * | 9/2006 | Hummel | 409/182 |
| 7,249,549 B2 * | 7/2007 | Stoffel | 83/477.2 |
| 7,409,973 B2 * | 8/2008 | Hyde | 144/286.5 |
| 7,588,400 B2 * | 9/2009 | Taylor | 409/182 |
| 2002/0194971 A1 | 12/2002 | Park et al. | |
| 2005/0056345 A1 | 3/2005 | Duginske | |
| 2005/0139056 A1 | 6/2005 | Gass et al. | |
| 2006/0086425 A1 * | 4/2006 | Hyde | 144/286.5 |
| 2006/0248998 A1 | 11/2006 | Duginske | |

OTHER PUBLICATIONS

Laguna Tools, Webpage at www.lagunatools.com/LM410.htm, LM410 Combination Machine, Printed Jan. 6, 2003, 2 pages.

Martin Woodworking Machines Corp., Webpage www.martin-usa.com/t_slidingsaw.asp, Sliding Table Saw T 73, including T 73 Basic, T 73 Classic and T 73 CNC, Printed Jan. 8, 2003, (2 pages).

Festool USA Tooltechnic Systems, LLC, MFT 800/MFT1080 Table, Master Festool USA Catalog 2005, (3 pages).

"Mechanical Engineers' Handbook", McGraw-Hill Book Company, Inc. 1958, Chapter 8, p. 134.

"Fine Woodworking", Remedy for a Worn Miter Gauge, Jul./Aug., No. 53, 1985, (3 pages).

"Fine Woodworking", Miter Gauges, Apr. 1992, (3 pages).

"1992 GarrettWade Tool Catalog", front and back cover pages and pp. 72-85 and 166, Garrett Wade Company, Inc.

"Wood Werks Supply, Inc.", Vises, clamps saws, 3 pages, (admitted prior art).

"Joiner's Edge High Precision T-Slot Extrusion Modular 3-in 2 Woodworking System", Schuler Toolworks, Ltd., 1 page, 1991.

"Farris Right Angle Gauge Lets You Make Perfect Miters of Any Angle", 1 page, (admitted prior art).

"Miter Gauge with Holddown (and Adjustable Strap)", 2 pages, (admitted prior art).

WoodsmithShop Catalog, "Adjustable Miter Fence", (2 pages, )1994.

Vega Enterprises, Inc., "Vega Performance Miter Gage", (2 pages), Aug. 1994.

* cited by examiner

INSERT PLATE LEVELING

TECHNICAL FIELD

The invention relates to insert plates for a workpiece support table, such as support table for a router.

BACKGROUND

Powered hand tools, such as, for example, routers, handsaws, drills, planers, and the like, are often mounted to a planar support structure, such as a support table, to allow simplified operation, for example, when operating on large workpieces. Precise operations, such as routing, cutting and/or sanding operations using a support table require that the powered hand tool is precisely positioned relative to the support table. Frequently, a powered hand tool is first fixed to an insert plate that is then mounted flush to the support table. To facilitate this mounting, a support table may include an approximately central through-hole to receive the powered hand tool mounted to the insert plate.

SUMMARY

In general, the invention relates to leveling an insert plate for a support table. Leveling is accomplished using a set of mounting and leveling apparatuses to attach the insert plate to the support table. The mounting and leveling apparatuses include at least one leveling device, such as a screw or bolt, which may be adjusted to change the distance between the insert plate and mounting bracket in order to mount the insert plate flush with the top surface of the support table. As the distance between the insert plate and mounting bracket is changed, the relative position of a surface of the insert plate changes with respect to the top surface of the support table.

In an embodiment, an assembly comprises a support table including a support table orifice; a insert plate within the support table orifice; and at least one mounting and leveling apparatus. The mounting and leveling apparatus comprises a clamp screw; at least two leveling screws; at least one mounting screw; and a mounting bracket that defines a first threaded hole that threadably engages the clamp screw, a second hole that receives the at least one mounting screw and a third set of threaded holes that each threadably engages one of the at least two leveling screws. The clamp screw pulls the insert plate towards mounting bracket when tightened. The at least one mounting screw couples the mounting bracket to the support table. The at least two leveling screws are independently adjustable to allow a top surface of the insert plate to be precisely aligned with a top surface of the support table.

Another embodiment is directed to a mounting and leveling apparatus, for mounting an insert plate to a support table. The mounting and leveling apparatus comprises a clamp screw; at least two leveling screws; at least one mounting screw; and a mounting bracket that defines a first threaded hole that threadably engages the clamp screw, a second hole that receives the at least one mounting screw and a third set of threaded holes that each threadably engages one of the at least two leveling screws. The clamp screw pulls the insert plate towards mounting bracket when tightened. The at least one mounting screw couples the mounting bracket to the support table. The at least two leveling screws are independently adjustable to allow a top surface of the insert plate to be precisely aligned with a top surface of the support table.

In another embodiment, a kit for mounting an insert plate to a support table comprises at least two mounting and leveling apparatuses and instructions for mounting the insert plate to the support table using the at least two mounting and leveling apparatuses. Each of the mounting and leveling apparatuses comprise a clamp screw; at least two leveling screws; at least one mounting screw; and a mounting bracket that defines a first threaded hole that threadably engages the clamp screw, a second hole that receives the at least one mounting screw and a third set of threaded holes that each threadably engages one of the at least two leveling screws. The clamp screw pulls the insert plate towards mounting bracket when tightened. The at least one mounting screw couples the mounting bracket to the support table, and the at least two leveling screws are independently adjustable to allow a top surface of the insert plate to be precisely aligned with a top surface of the support table.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
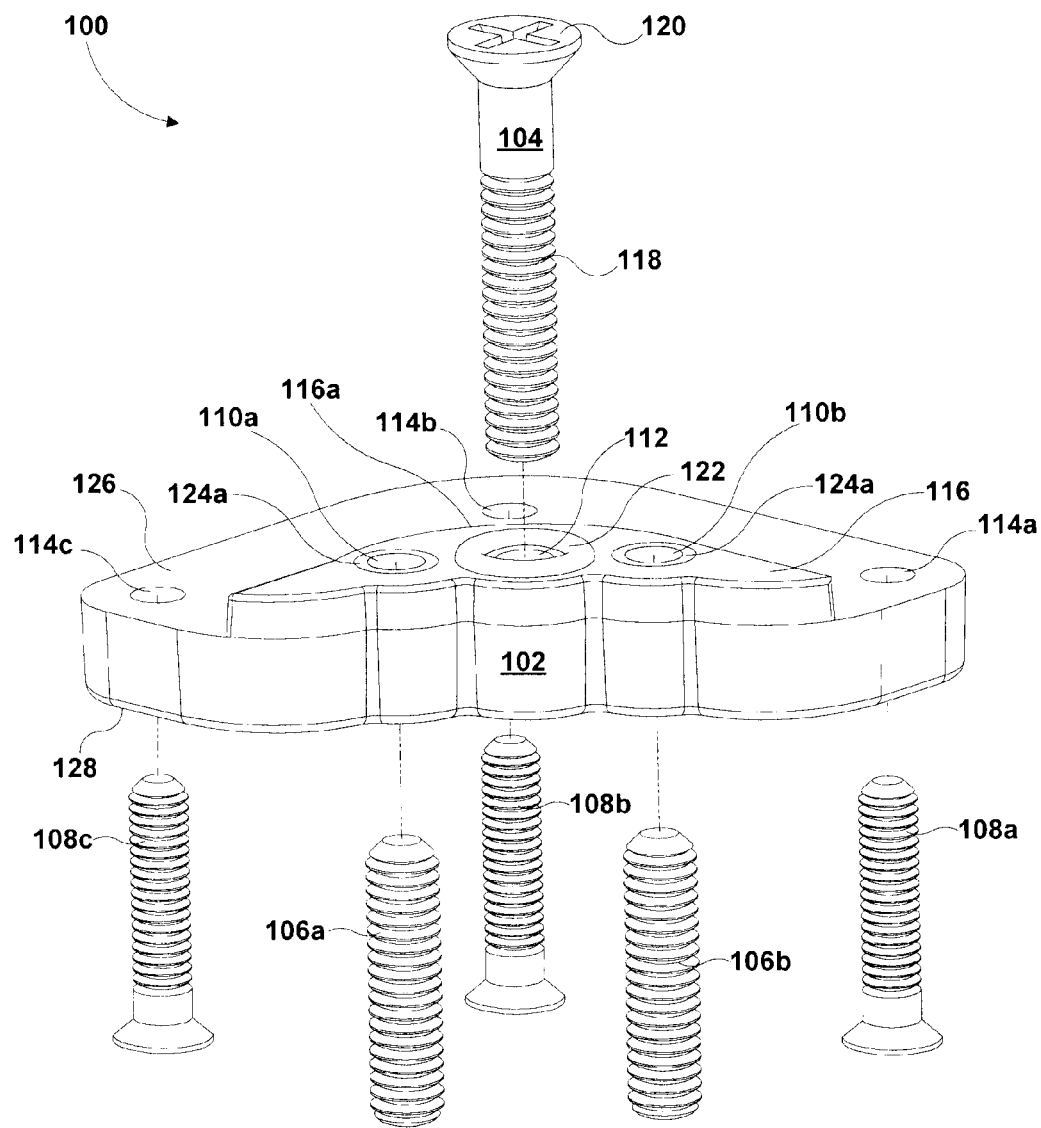
FIG. 1 illustrates a mounting and leveling apparatus for coupling a insert plate to a support table.
Figure 2:
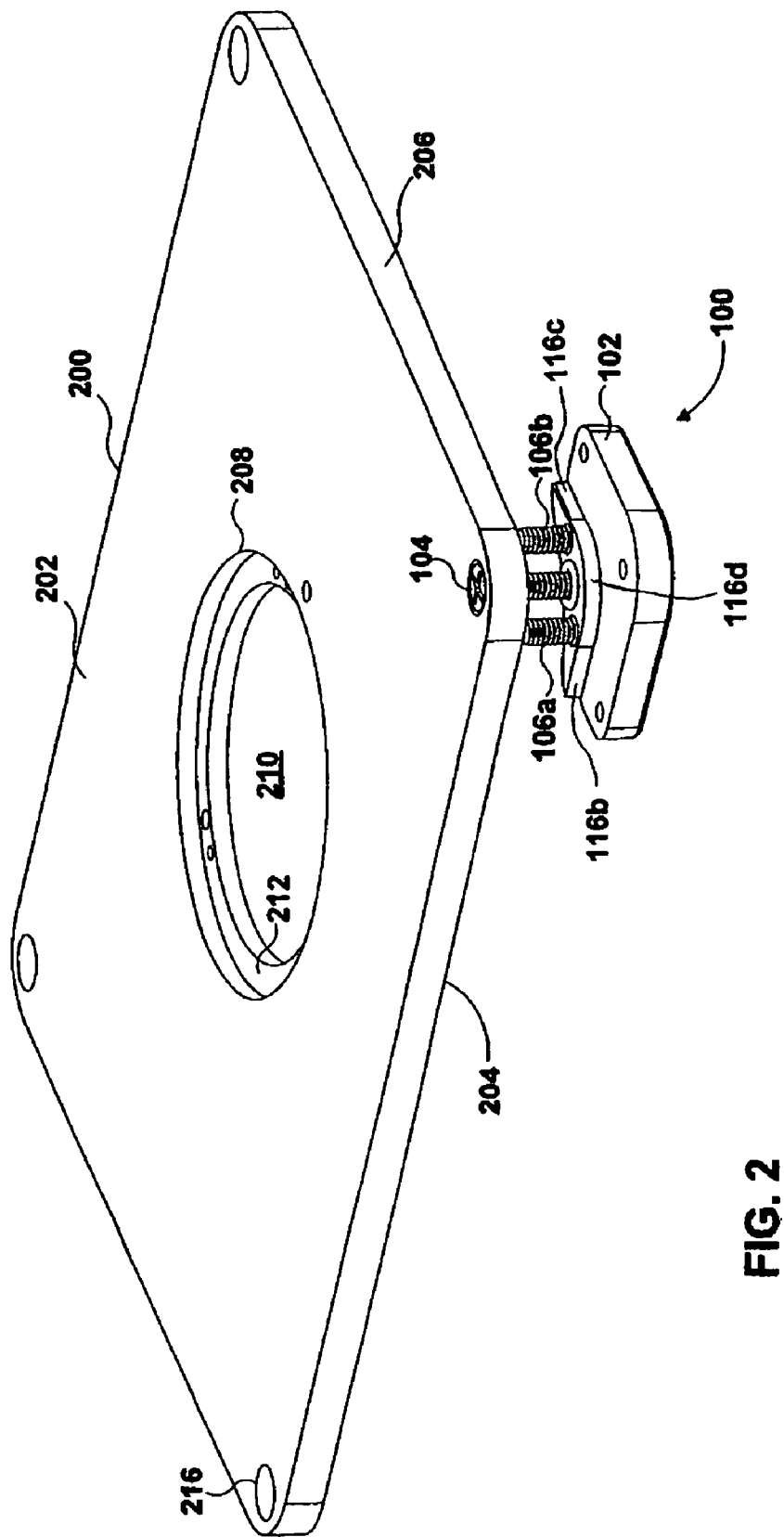
FIG. 2 illustrates a mounting and leveling apparatus coupled to a insert plate.
Figure 3:
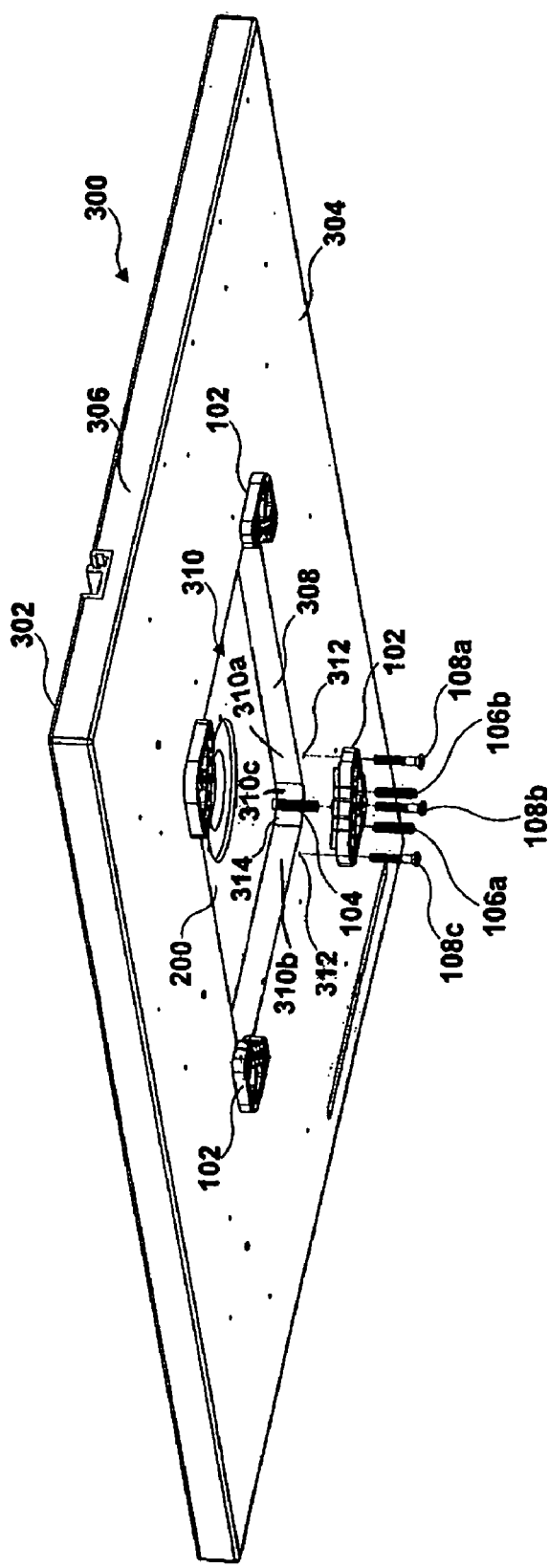
FIG. 3 illustrates a view of support table, four mounting and leveling apparatuses and a insert plate.
Figure 4:
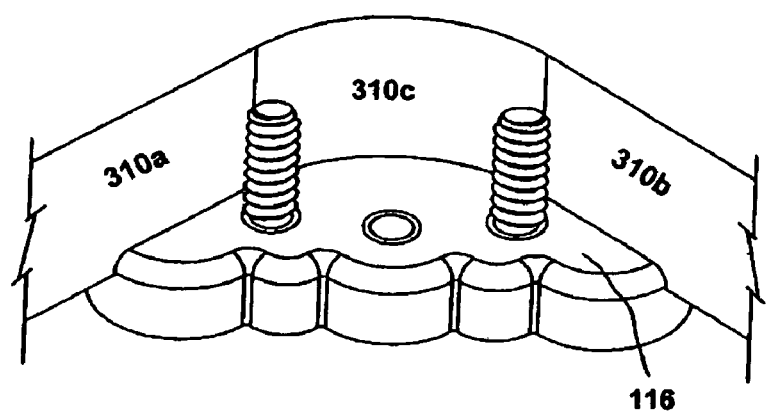
FIG. 4 illustrates a mounting bracket registered to a support table orifice.

FIGS. 1-3 generally illustrate a mounting and leveling apparatus 100 for coupling a insert plate 200 to support table 300. As best seen in FIG. 1, the mounting and leveling apparatus 100 includes mounting bracket 102, clamp screw 104, first leveling screw 106a and second leveling screw 106b (collectively "leveling screws 106"). Apparatus 100 further includes first mounting screw 108a, second mounting screw 108b and third mounting screw 108c (collectively "mounting screws 108").

As best seen in FIG. 2, insert plate 200 includes top surface 202 and bottom surface 204 substantially opposite top surface 202. Top and bottom surfaces 202, 204 are joined by periphery wall 206, which in the illustrated embodiment defines a generally rectangular shape of insert plate 200. In other embodiments, insert plate 200 may be generally triangular, circular or elliptical, or may include any other desired geometry.

A hand tool (not shown) is generally fixed to insert plate 200 by screws or other suitable mechanism. Insert plate 200 further includes inner wall 208 that defines orifice 210. Orifice 210 is sized to allow the cutting mechanism of a powered hand tool, such as, a router, saw, sander or the like, to extend above top surface 202 when the powered hand tool is mounted to insert plate 200. Inner wall 208 forming orifice 210 includes ledge 212 extending radially inward from a lower section of inner wall 208. Ledge 212 may be used to support a plate (not shown) with an orifice that more closely matches the size of the cutting mechanism of the hand tool mounted to insert plate 200 than orifice 210. Such a plate may be fixed to insert plate 200 using screws or other suitable mechanism. Because different plates may be mounted within orifice 210 on ledge 212, insert plate 200 is suitable for a variety hand tools and multiple size cutting mechanisms. For example, different plates may be used for different hand tools. As anther example, different plates may be used for routing bits of different sizes without removing the router from insert plate 200.

Insert plate 200 supports a hand tool, and as well as work pieces that are worked on by the hand tool. Because of this, it is desirable for insert plate 200 to be formed from strong and durable materials. For example, insert plate 200 may be formed from suitable materials such as a metal, polymer, a filled resin, wood or the like.

As FIG. 3 illustrates, support table 300 includes a generally planar top surface 302 and a generally planar bottom surface 304 oriented substantially opposite top surface 302. Top and bottom surfaces 302, 304 are connected by peripheral wall 306, which defines a generally rectangular perimeter of support table 300. Support table 300 further includes inner wall 308 that defines orifice 310 sized to receive insert plate 200. Orifice 310 is preferably sized such that inner wall 308 and periphery wall 206 form an intimate fit with each other. That is, it may be preferred that insert plate 200 is sized such that there is a minimal gap between periphery wall 206 and inner wall 308 once insert plate 200 is inserted in orifice 310. This may facilitate the use of the hand tool on a work piece larger (e.g., in at least one dimension) than insert plate 200 by, for example, reducing the chances that the work piece catches on an edge of either insert plate 200 or support table 300. Of course the leveling adjustment capability of mounting and leveling apparatus 100 also reduces the chances that the work piece catches on an edge of either insert plate 200 or support table 300.

Support table 300 may be of any suitable size and may be supported by a support frame or other support structure. For example, support table 300 may be designed to rest on a work bench, and may thus include a relatively short support frame to suspend the support table 300 off of the work bench enough to provide clearance for a hand tool mounted to insert plate 200. In other embodiments, support table 300 may include a frame which supports table 300 off of a floor at a desirable height. Support table 300 may include a durable and strong material, such as, for example, a metal such as aluminum or steel, wood, or the like.

It is generally desirable that top surface 302 of support table 300 and top surface 202 of insert plate 200 provide a substantially planar surface to support a work piece that is to be manipulated by the hand tool. Because insert plate 200 may experience wear during use of the hand tool, the thickness and/or thickness uniformity of insert plate 200 can change over the course of the lifetime of the insert plate. For example, insert plate 200 may wear substantially uniformly, and become thinner over substantially its entire area. As another example, a groove or depression corresponding to a common pattern of movement of a work piece across surface 202 of insert plate 200 may be formed over the course of time. Likewise, top surface 302 of support table 300 may also wear over time.

Regardless of the cause and/or evolution of any variation in the alignment of surface 202 of insert plate 200 with respect to surface 302 of support table 300, it is desirable that this variation can be mitigated or fully corrected. Mounting and leveling apparatus 100 allows for straightforward and flexible adjustment of the position of surface 202 of insert plate 200 with respect to surface 302 of support table 300.

For example, the combination of mounting bracket 102, clamp screw 104 and leveling screws 106 allows precise adjustment of the distance between leveling plate 102 and surface 202. Further, the use of at least two leveling screws 106 allows a user to adjust not only the distance between leveling plate 102 and surface 202, but also the relative pitch of surface 202 of insert plate 200 with respect to leveling plate 102 (e.g., top surface 126 of leveling plate 102). As will be described in greater detail below, the configuration of mounting and leveling apparatus 100 allows precise positioning of leveling plate 102 relative to support table 300. For example, mounting and leveling apparatus 100 may be used to align top surface 202 of insert plate 200 with surface 302 of support table 300 even if insert plate 200 becomes worn or warped over time.

As shown in FIG. 3, in one embodiment, a system including a support table 300 defining a generally rectangular orifice 310 and a generally rectangular insert plate 200 may beneficially employ four mounting and leveling apparatuses 100 to allow adjustment of the position of surface 202 with respect to surface 302 at four locations. Employing more than one mounting and leveling apparatuses 100 may allow greater adjustment flexibility to facilitate adjustment of a position of surface 202 with respect surface 302. For example, utilizing more than one mounting and leveling apparatus 100 may allow correction for any warp or thickness gradation of insert plate 200. In other embodiments, more than four or fewer than four mounting and leveling apparatuses 100 may be employed.

Mounting plate 102 couples to support table 300 via mounting screws 108a, 108b, 108c (collectively "mounting screws 108"), which extend through-holes 114a, 114b, 114c (collectively "holes 114"), respectively. Holes 114 may include substantially smooth sidewalls. Mounting screws 108 then threadably engage with mounting holes 312 of support table 300 to couple mounting bracket 102 with support table 300. In other embodiments, mounting screws 108 may be self tapping screws, such as wood screws, that do not require threaded holes or even holes in support table 300. While three mounting screws 108 are illustrated in the figures, in other embodiments, any useful number of mounting screws 108 may be utilized. For example, in some embodiments, the mounting bracket 102 may be coupled to the support table using at least one mounting screw 108.

Mounting plate 102 may be generally triangular in shape, as illustrated in the figures. However, it will be understood that the shape of the mounting bracket 102 is not thus limited, and may include other shapes, such as, for example, rectangular, circular, elliptical, or any other useful shape. Mounting plate may be formed of a wide range of materials, including, for example, metal, polymer, filled resin, or the like. In some embodiments, mounting bracket 102 includes a filled resin, such as, for example, a glass filled resin.

In the illustrated embodiment, mounting bracket 102 also includes a protrusion 116, best seen in FIG. 1. In the embodiment shown in the figures, protrusion 116 is shaped to register mounting bracket 102 with a corner 314 of the generally rectangular orifice 310 defined in support table 300. To accomplish this, in the illustrated embodiment, the protrusion 116 includes edge 116a that is curved with a radius of curvature approximately equal to the radius of curvature of the corner 314 of orifice 310. More specifically the protrusion 116 is formed by a first straight side 116b and a second straight side 116c and an arched corner 116d. The first straight side 116b of the protrusion 116 is continuous with the arched corner 116b of the protrusion and the arched corner 116d of the protrusion 116 is continuous with the second straight side 116c of the protrusion 116. In other embodiments corner 314 may have a different shape such as a right-angle; in any embodiment protrusion 116 may be configured to match the shape of corner 314. Registering mounting bracket 102 to corner may substantially align holes 312 of support table 300 with holes 114 of mounting bracket 102 to facilitate insertion and threading of mounting screws 108.

Rectangular orifice 310 is a straight-cut through-hole in support table 300. Rectangular orifice 310 may be created using a jigsaw or other suitable cutting instrument. The support table orifice 310 defines a first straight side 310a and a second straight side 310 and an arched corner 310c. The first straight side 310a of the support table orifice 310 is continuous with the arched corner 310c of the support table orifice 310 and the arched corner 310c of the support table orifice 310 is continuous with the second straight side 310b of the support table orifice 310. Thus, the first and second straight sides 116b and 116c of the protrusion 116 and the arched corner 116d of the protrusion 116 extends into the support table orifice 310 and continuously engages the first and second straight sides 310a and 310b of the support table orifice 310 and arched corner 310c of the support table orifice 310. In this manner, a kit including a set of mount and leveling apparatuses 100 and an insert plate 200 could be installed on any suitable table by cutting any suitable table to include orifice 310. For example, such a kit may include a template for orifice 310.

In other embodiments, mounting bracket 102 may not include a protrusion 116 to register the mounting bracket 102 to corner 314 of orifice 310. In yet other embodiments, mounting bracket 102 may include a plurality of features which register mounting bracket 102 to corner 314 of orifice 310. For example, mounting bracket 102 may include at least two smaller protrusions which together register mounting bracket 102 to corner 314 of orifice 310. Further, in other embodiments, mounting bracket 102 may include protrusions or other features which register mounting bracket 102 to another location of orifice 310, such as, for example, a location along an edge of orifice 310.

As is best seen in FIG. 1, leveling screws 106 are threaded into holes 110a and 110b (collectively "holes 110") from the direction of bottom surface 128 of mounting bracket 102. As shown in FIG. 1, holes 110 and hole 112, which is configured to receive clamp screw 104, form a straight line. Furthermore, holes 110 are substantially equidistant from hole 112. In other embodiments, holes 110 may not be substantially equidistant from hole 112. Holes 110 may themselves be threaded, or may included a threaded inserts 124a and 124b molded into mounting bracket 102. Threaded inserts 124a and 124b may include a highly durable and strong material, such as, for example, brass or steel.

Leveling screws 106 may be threaded through-holes 110 until each leveling screw 106a and 106b protrudes from top surface 126 of mounting bracket 102. In this manner, leveling screws 106 are threaded through-holes 110 in the opposite direction that clamp screw 104 is threaded through-hole 112. To accomplish the threading, leveling screws 106 may include suitable features to allow mating with a screw bit, such as a hex head bit, a Phillips bit, or the like.

Leveling screws 106 form contact sites on which insert plate 200 rests. Adjusting the length of each of leveling screws 106 that protrudes from surface 126 of mounting bracket 102, then, likewise adjusts the distance between major surface 126 of mounting bracket 102 and bottom surface 204 of insert plate 200 at each point of contact.

Additionally, providing at least two leveling screws 106 in each mounting and leveling apparatus 100 allows a user to finely position insert plate 200 with respect to support table 300. For example, utilizing two leveling screws 106 in each apparatus 100 may allow a user to correct the angle at which insert plate 200 is oriented at the location of each apparatus 100. In contrast, use of a single leveling screw 106 at each apparatus 100 would not allow this fine adjustment or twisting of insert plate 200 to restore its flatness in the event it became warped. While FIG. 1 illustrates two holes 110, in other embodiments, may include more than two holes 110 and a corresponding number of leveling screws 106. The use of at least two leveling screws 106 may provide a more secure support of insert plate 200 than a single leveling screw 106 would allow. Likewise, in alternative embodiments, more than one hole 112 and corresponding clamp screw 104 may be utilized.

As is best seen in FIG. 2, clamping screw 104 is inserted into hole 216 of insert plate 200 from the side of surface 202. In the illustrated embodiment, hole 216 includes a countersunk opening in surface 202, which may minimize the extent to which clamping screw 104 protrudes from surface 202. Clamp screw 104 is then threaded through-hole 112 of mounting bracket 102. Hole 112 may itself be threaded, or may included a threaded insert 122 molded into mounting bracket 102. Threaded insert 122 may include a highly durable and strong material, such as, for example, brass or steel. Clamping screw 104 couples insert plate 200 to mounting bracket 102 and preferably firmly contacts insert plate 200 and leveling screws 106. Once clamping screw 104 is sufficiently tightened, the mounting and leveling apparatus 100 substantially prevents movement of insert plate 200 with respect to support table 300. While a single clamping screw 104 for each mounting and leveling apparatus 100 is illustrated in the figures, in other embodiments, more than one clamping screw 104 may be utilized.

The support table 300 may further incorporate a fence system. One exemplary fence system includes a universal machinery fence system, as described in further detail in U.S. Patent Application Publication No. 2006/0248998, which is incorporated herein by reference in its entirety. Generally, the universal machinery fence system has a rail for attachment to a support table 300 of a workpiece manipulation machine and the rail defines a track. A clamp block is releasably assembled to the rail with surfaces that mate with the track of the rail to guide the clamp block linearly along the rail. The clamp block includes a fastener for securing the position of the clamp block along the rail. The system includes a fence for guiding a workpiece into a workpiece manipulation tool, the fence being fixed to the clamp block. The clamp block and fence can be used on, for example, a band saw, a router, a table saw, a drill press, or the like, by substituting the rail for a rail of a different cross-sectional shape.

A kit may be useful to allow a craftsman to mount an insert plate to a homemade support table. A kit for mounting an insert plate to a support table may include at least two mounting and leveling apparatuses, such as mounting and leveling apparatus 100 (FIG. 1). For example, a kit may include exactly four mounting and leveling apparatuses to facilitate mounting a rectangular insert plate to a support table. In some embodiments, as kit may include the insert plate itself. Such a kit may also include a template for forming an orifice for the insert plate in the homemade support table.

A kit may optionally include a screw driver for the screws in the mounting and leveling apparatuses. For example, the screw driver may be a Phillips screw driver, a flathead screw driver, an allen wrench, or a square drive. In embodiments having screws with different screw head configurations, a kit may include a screw driver for each screw head configuration. In one embodiment, a kit may include an alien wrench and a square drive.

Various embodiments of the invention have been described. These and other embodiments are within the scope of the following claims.

The invention claimed is:

1. An assembly comprising:
a support table including a support table orifice;
an insert plate within the support table orifice; and
a mounting and leveling apparatus comprising:
a clamp screw;
and
a mounting bracket that defines a first threaded hole that threadably engages the clamp screw, a second set of holes receiving mounting screws and a third set of threaded holes that each threadably engages leveling screws such that the leveling screws protrude from a top surface of the mounting bracket,
wherein the mounting bracket has a protrusion that is formed by a first straight side and a second straight side and an arched corner;
wherein the first straight side of the protrusion is continuous with the arched corner of the protrusion and the arched corner of the protrusion is continuous with the second straight side of the protrusion;
wherein the third set of threaded holes are defined in the protrusion;
wherein the support table orifice defines a first straight side and a second straight side and an arched corner;
wherein the first straight side of the support table orifice is continuous with the arched corner of the support table orifice and the arched corner of the support table orifice is continuous with the second straight side of the support table orifice;
and wherein the first and second straight sides of the protrusion and the arched corner of the protrusion extends into the support table orifice and continuously engages the first and second straight sides of the support table orifice and arched corner of the support table orifice;
wherein the clamp screw pulls the insert plate towards the mounting bracket when tightened such that the leveling screws contact the insert plate and form contact sites upon which the insert plate rests,
wherein the mounting screws couple the mounting bracket to the support table, and wherein the leveling screws are independently adjustable to allow a top surface of the insert plate to be precisely aligned with a top surface of the support table.

2. The assembly of claim 1, wherein the mounting bracket comprises a threaded metal insert that defines the first threaded hole.

3. The assembly of claim 1, wherein the mounting bracket comprises threaded metal inserts wherein each threaded metal insert defines each threaded hole of the third set of threaded holes.

4. The assembly of claim 1, wherein the mounting screws comprises three mounting screws, and wherein the second set of holes comprises three holes.

5. A mounting and leveling apparatus, comprising:
a clamp screw;
and
a mounting bracket that defines a first threaded hole that threadably engages the clamp screw, a second set of holes receiving mounting screws and a third set of threaded holes that each threadably engages leveling screws,
wherein the clamp screw pulls an insert plate towards the mounting bracket when tightened,
wherein the mounting screws couple the mounting bracket to a support table,
wherein the leveling screws are independently adjustable to allow a top surface of the insert plate to be precisely aligned with a top surface of the support table; and
wherein the mounting bracket has a protrusion that is formed by a first straight side and a second straight side and an arched corner;
wherein the first straight side of the protrusion is continuous with the arched corner of the protrusion and the arched corner of the protrusion is continuous with the second straight side of the protrusion;
wherein the third set of threaded holes are defined in the protrusion;
wherein the support table has an orifice that defines a first straight side and a second straight side and an arched corner;
wherein the first straight side of the support table orifice is continuous with the arched corner of the support table orifice and the arched corner of the support table orifice is continuous with the second straight side of the support table orifice;
and wherein the first and second straight sides of the protrusion and the arched corner of the protrusion extends into the support table orifice and continuously engages the first and second straight sides of the support table orifice and arched corner of the support table orifice.

6. The mounting and leveling apparatus of claim 5, wherein the mounting bracket comprises a threaded metal insert that defines the first threaded hole.

7. The mounting and leveling apparatus of claim 5, wherein the mounting bracket comprises a threaded metal insert wherein the threaded metal insert defines a threaded hole of one of the third set of threaded holes.

8. The mounting and leveling apparatus of claim 5, wherein the mounting screws comprises three mounting screws, and wherein the second set of holes comprises three holes.

9. The assembly of claim 1, wherein a portion of the support table is clamped in between the insert plate and a portion of the mounting bracket upon which the protrusion is formed on.

* * * * *